(12) United States Patent
Park et al.

(10) Patent No.: US 10,939,032 B2
(45) Date of Patent: Mar. 2, 2021

(54) ELECTRONIC DEVICE, AND AUTOFOCUS PROCESSING METHOD FOR MAINTAINING CONTINUITY OF AUTOFOCUS SEARCH IN ELECTRONIC DEVICE

(71) Applicant: Samsung Electronics Co., Ltd., Suwon-si (KR)

(72) Inventors: Byeong-Chan Park, Yongin-si (KR); Kyung-Dong Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 15/774,879

(22) PCT Filed: Nov. 11, 2016

(86) PCT No.: PCT/KR2016/013007
§ 371 (c)(1),
(2) Date: May 9, 2018

(87) PCT Pub. No.: WO2017/082676
PCT Pub. Date: May 18, 2017

(65) Prior Publication Data
US 2020/0267304 A1    Aug. 20, 2020

(30) Foreign Application Priority Data

Nov. 11, 2015  (KR) .................. 10-2015-0158191

(51) Int. Cl.
*H04N 5/228*  (2006.01)
*H04N 5/232*  (2006.01)
(Continued)

(52) U.S. Cl.
CPC .......... *H04N 5/23212* (2013.01); *G02B 7/38* (2013.01); *G03B 13/36* (2013.01); *H04N 5/2258* (2013.01);
(Continued)

(58) Field of Classification Search
CPC ............ H04N 5/23212; H04N 5/2258; H04N 5/2351; G02B 7/38; G03B 13/36
(Continued)

(56) References Cited

U.S. PATENT DOCUMENTS 6,707,491 B1    3/2004  Choi
6,859,620 B2    2/2005  Yoshida
(Continued)

FOREIGN PATENT DOCUMENTS

JP    9-90460 A        4/1997
JP    2010-068046 A    3/2010
(Continued)

*Primary Examiner* — Usman A Khan
(74) *Attorney, Agent, or Firm* — Jefferson IP Law, LLP

(57) ABSTRACT

Various examples of the present invention relate to an electronic device, and an autofocusing processing method in the electronic device, and the electronic device can: receive a first image obtained by imaging a subject at a first position of at least one lens, when autofocus searching is performed; perform image processing and autofocus processing for the first image; receive a second image obtained by imaging the subject at a second position of the lens; generate compensation information by using first brightness information of the first image and second brightness information of the second image; compensate for the brightness of the second image by using the compensation information; and perform image processing and autofocus processing for the second image of which the brightness has been compensated for.

17 Claims, 8 Drawing Sheets

(51) Int. Cl.
  *G02B 7/38* (2021.01)
  *G03B 13/36* (2021.01)
  *H04N 5/225* (2006.01)
  *H04N 5/235* (2006.01)

(52) U.S. Cl.
  CPC ..... *H04N 5/2351* (2013.01); *H04N 5/232123* (2018.08)

(58) Field of Classification Search
  USPC ...................................................... 348/222.1
  See application file for complete search history.

(56) References Cited

U.S. PATENT DOCUMENTS

| | | |
|---|---|---|
| 2007/0187571 A1 | 8/2007 | Ebe et al. |
| 2008/0074530 A1* | 3/2008 | Okawa ............... H04N 5/23212 348/345 |
| 2011/0187900 A1 | 8/2011 | Park et al. |
| 2012/0162467 A1 | 6/2012 | Nakamura |
| 2013/0083180 A1* | 4/2013 | Sasaki ...................... B41J 2/161 348/65 |
| 2013/0135520 A1* | 5/2013 | Sugimoto .......... H04N 5/23212 348/349 |
| 2015/0181107 A1 | 6/2015 | Park et al. |
| 2016/0291482 A1* | 10/2016 | Shih .................... G03F 7/70641 |

FOREIGN PATENT DOCUMENTS

| | | |
|---|---|---|
| JP | 2011-049892 A | 3/2011 |
| JP | 2013-228541 A | 11/2013 |
| KR | 10-0915182 B1 | 8/2009 |
| KR | 10-2011-0089665 A | 8/2011 |
| KR | 10-2015-0074641 A | 7/2015 |

\* cited by examiner

|  | BEFORE COMPENSATION | | | | AFTER COMPENSATION | | | |
|---|---|---|---|---|---|---|---|---|
| 10EV<br>(FIRST IMAGE) | 10 | 20 | 40 | 50 | 10 | 20 | 40 | 50 |
|  | 10 | 30 | 80 | 60 | 10 | 30 | 80 | 60 |
|  | 10 | 40 | 80 | 70 | 10 | 40 | 80 | 70 |
| 11EV<br>(1 EV DARKER)<br>(SECOND IMAGE) | 5 | 10 | 20 | 25 | 10 | 20 | 40 | 50 |
|  | 5 | 15 | 40 | 30 | 10 | 30 | 80 | 60 |
|  | 5 | 20 | 40 | 35 | 10 | 40 | 80 | 70 |

FIG.3

ELECTRONIC DEVICE, AND AUTOFOCUS PROCESSING METHOD FOR MAINTAINING CONTINUITY OF AUTOFOCUS SEARCH IN ELECTRONIC DEVICE

CROSS-REFERENCE TO RELATED APPLICATION(S)

This application is a National Phase Entry of PCT International Application No. PCT/KR2016/013007, which was filed on Nov. 11, 2016, and claims priority to Korean Patent Application No. 10-2015-0158191, which was filed on Nov. 11, 2015, the contents of which are incorporated herein by reference.

1. FIELD

Various embodiments of the present disclosure generally relate to an electronic device, and an autofocus processing method in an electronic device.

2. DESCRIPTION OF THE RELATED ART

Electronic devices with a photographing function, for example, a digital camera, are capable of automatically focusing on a subject using an autofocus (AF) system.

The autofocus system enables an electronic device to quickly and accurately focus on a subject, compared with a manual focus system, and enables the electronic device to automatically focus by analyzing the contrast between images obtained from an image sensor.

The autofocus system is broadly divided into an active system and a passive system. In the active system, a camera may emit ultrasonic waves or infrared rays to measure distance. In the passive system, a camera focuses on an object using light naturally reflected on the object.

SUMMARY

The autofocus system may extract a high-frequency component from an image and may obtain an evaluation value for evaluating a degree of focusing on a subject, thereby adjusting the correct focus on the subject.

When an exposure amount is changed while the electronic device performs autofocusing by calculating an evaluation value from an image signal captured at a separate position set by the movement of a lens, image data for autofocus processing is affected. In this case, when the exposure amount is changed, an evaluation value calculated from an image signal with the changed exposure amount is different from an evaluation value calculated from an image signal at the same focus position with the unchanged exposure amount, and thus the focus for the subject is directed to a wrong position.

Further, when the exposure amount is changed, the electronic device resets previously captured data and restarts autofocusing from the time the exposure amount is changed in order to detect the focus at a new position, thus not accurately focusing.

Therefore, various embodiments of the present disclosure are aimed at providing an electronic device and a method for autofocus processing that are capable of maintaining continuity of an autofocus search without resetting, for example, despite a change in the exposure amount.

To solve the foregoing problem or other problems, an electronic device according to any one of various embodiments may include: a signal processing module configured to receive a first image obtained by photographing a subject at a first position of at least one lens and to receive a second image obtained by photographing the subject at a second position of the lens, when an autofocus search is implemented; an image compensation module configured to generate compensation information using first brightness information on the first image and second brightness information on the second image and to compensate for a brightness of the second image using the compensation information; and an autofocus processing module configured to perform image processing and autofocus processing on the first image and the second image with the compensated brightness.

Further, a method for autofocus processing in an electronic device according to any one of various embodiments may include: receiving a first image obtained by photographing a subject at a first position of at least one lens when an autofocus search is implemented; performing image processing and autofocus processing on the first image; receiving a second image obtained by photographing the subject at a second position of the lens; generating compensation information using first brightness information on the first image and second brightness information on the second image; compensating for a brightness of the second image using the compensation information; and performing image processing and autofocus processing on the second image with the compensated brightness.

An electronic device and a method for autofocus processing in an electronic device according to various embodiments may maintain continuity of an autofocus search without resetting the autofocus search despite a change in the exposure amount, thereby accurately focusing on a subject.

BRIEF DESCRIPTION OF DRAWINGS

The above and other aspects, features and advantages of the present disclosure will be more apparent from the following detailed description taken in conjunction with the accompanying drawings, in which:

FIG. 3 illustrates an example of image compensation in an electronic device according to various embodiments of the present disclosure;

DETAILED DESCRIPTION

Figure 1:
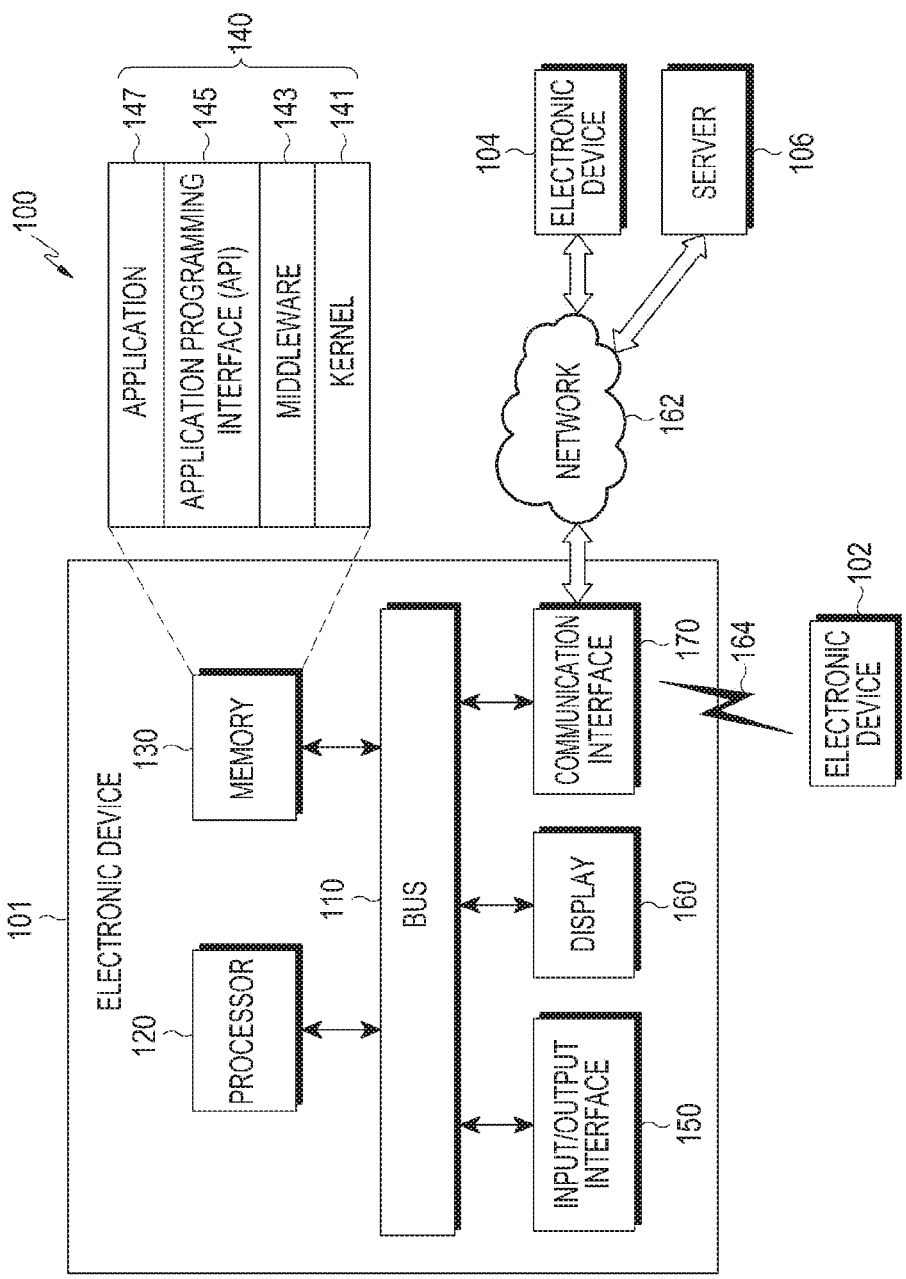
FIG. 1 illustrates a network environment according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user"

may indicate a person using an electronic device or a device (e.g., an artificial intelligence electronic device) using an electronic device.

FIG. 1 illustrates an electronic device 101 in a network environment 100 according to various embodiments. The electronic device 101 may include a bus 110, a processor 120, a memory 130, an input/output interface 150, a display 160, and a communication module 170. In some embodiments, at least one of the components may be omitted, or additional components may be further included in the electronic device 101.

The bus 110 may include, for example, a circuit that connects the components 110 to 170 to each other and delivers communications (for example, control messages and/or data) between the components.

The processor 120 may include one or more of a Central Processing Unit (CPU), an Application Processor (AP), and a Communication Processor (CP). The processor 120 may control, for example, at least one different component of the electronic device 101, and/or may perform an operation relating to communication or data processing.

The memory 130 may include a volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an Application Programming Interface (API) 145, and/or an application program (or "application") 147. At least part of the kernel 141, the middleware 143, and the API 145 may be designated as an Operating System (OS).

The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data.

Further, the middleware 143 may process one or more requests for operations received from the application 147 according to the priority thereof. For example, the middleware 143 may assign at least one application 147 a priority for using a system resource (for example, the bus 110, the processor 120, the memory 130, or the like) of the electronic device 101. For example, the middleware 143 may process the one or more requests for operations according to the priority assigned to the at least one application, thereby performing scheduling or load balancing for the one or more requests for operations.

The API 145 is, for example, an interface for the application 147 to control a function provided from the kernel 141 or the middleware 143, and may include, for example, at least one interface or function (for example, a command) for file control, window control, image processing, or text control.

The input/output interface 150 may serve as an interface that delivers a command or data, which is input from, for example, a user or a different external device, to a different component(s) of the electronic device 101. Further, the input/output interface 150 may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, a symbol, or the like) for the user. The display 160 may include a touch screen and may receive touch, gesture, proximity, or hovering input using, for example, an electronic pen or a body part of a user.

The communication module 170 may be a communication interface capable of establishing communication, for example, between the electronic device 101 and an external device (for example, a first external electronic device 102, a second external electronic device 104, or a server 106). For example, the communication module 170 may be connected to a network 162 via wireless communication or wire-based communication to communicate with the external device (for example, the second external electronic device 104 or the server 106).

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 164. The short-range communication 164 may include, for example, at least one of Wi-Fi, Bluetooth, Near-Field Communication (NFC), ZigBee, Z-Wave, and Global Navigation Satellite System (GNSS). The GNSS may include, for example, at least one of a Global Positioning System (GPS), a Global Navigation Satellite System (GLONASS), a BeiDou Navigation Satellite System (hereinafter, "BeiDou"), and Galileo, which is the European global satellite-based navigation system, depending on a use area or bandwidth. In the present document, "GPS" may be interchangeably used with "GNSS" hereinafter. The wire-based communication may include, for example, at least one of Universal Serial Bus (USB), High-Definition Multimedia Interface (HDMI), Recommended Standard 232 (RS-232), and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

The first and second external electronic devices 102 and 104 may each be a device of a type that is the same as, or different from, that of the electronic device 101. According to one embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the same received result or by additionally processing the result. To this end, cloud-computing, distributed-computing, or client-server-computing technologies may be used.

Hereinafter, an electronic device according to various embodiments of the present disclosure is described with reference to the accompanying drawings.

Figure 2:
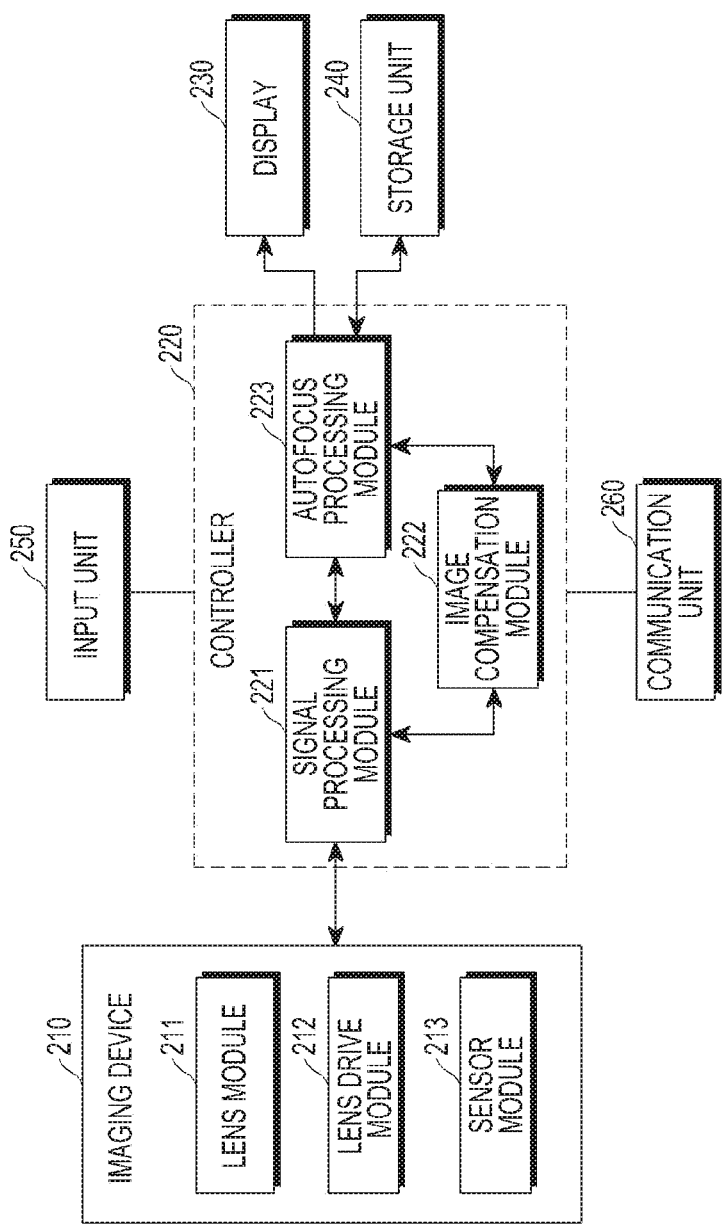
FIG. 2 illustrates an example of the configuration of an electronic device according to various embodiments of the present disclosure.

FIG. 2 illustrates an example of the configuration of an electronic device according to various embodiments of the present disclosure, and FIG. 3 illustrates an example of image compensation in an electronic device according to various embodiments of the present disclosure.

Referring to FIG. 2, according to various embodiments of the present disclosure, an electronic device (for example, the electronic device 101 of FIG. 1) may include at least one of an imaging device 210, a controller 220, a display 230, a storage unit 240, an input unit 250, and a communication unit 260.

According to various embodiments of the present disclosure, the imaging device 210 may include at least one of a lens module 211, a lens drive module 212, and a sensor module 213.

The lens module 211 may include at least one lens (for example, a focus lens) and may automatically focus on a subject, by being moved by the lens drive module 212 in a particular direction (for example, the vertical direction of the imaging device 210). The lens drive module 212 may move the lens module 211 in the particular direction. The sensor module 213 may sense light incident through the at least one lens (for example, the focus lens). According to various embodiments, the sensor module 213 may include at least one sensor (for example, a Charge-Coupled Device (CCD) or CMOS image sensor). The image sensor may detect the amount of light using a change in the amount of charges depending on light intensity. That is, the image sensor may determine only the brightness and darkness of light. In addition, according to various embodiments, since the sensor module 213 determines only the brightness and darkness of sensed light, the imaging device 210 may further include a color filter (for example, an RGB filter or a CMY filter) to obtain color information.

According to various embodiments of the present disclosure, the controller 220 (for example, the processor 120 of FIG. 1) may include at least one of a signal processing module 221, an image compensation module 222, and an autofocus (AF) module 223.

According to various embodiments of the present disclosure, the signal processing module 221 may convert an analog signal of light sensed by the sensor module 213 into a digital signal and may store the converted digital signal to a buffer memory of the storage unit 240. The converted digital signal is a pixel-unit signal.

According to various embodiments of the present disclosure, the image compensation module 222 may detect brightness information from a digital signal processed by the signal processing module 221, that is, an image (raw image data) captured by photographing a subject, and may compensate for the brightness of the captured image based on the brightness information. According to various embodiments, when the focus lens of the lens module 211 is driven to initiate autofocus, the image compensation module 222 may store brightness information (for example, first brightness information) detected from an image (frame) received at the autofocus-initiated time. When the focus lens moves to a next focus position, the image compensation module 222 may obtain brightness information (for example, second brightness information) from an image (frame) received at the moved position and may compare the obtained brightness information with the brightness information at the autofocus-initiated time, thereby generating compensation information. The image compensation module 222 may calculate a compensation gain value for performing gain processing corresponding to the difference between the first brightness information and the second brightness information and may generate the calculated compensation gain value as the compensation information. According to various embodiments, the compensation gain value may be calculated by Equation 1. For example, when automatic exposure is processed based on a unit of 1 EV, which is a brightness adjustment unit set by the imaging device 210, the unit of 1 EV is the unit of log 2 and thus represents a double difference. Therefore, when the exposure value of light exposed to the image sensor is increased by 1 EV, the brightness of the captured image (raw image data) may be reduced by ½.

$$\text{Compensation gain} = \text{Power}(2, \text{current } EV - \text{reference } EV) = 2^{\wedge}(11-10) = 2 \qquad \text{Equation 1}$$

According to various embodiments, the image compensation module 222 may obtain the exposure value at the autofocus-initiated time, for example, a reference exposure value of 10 EV, as brightness information. When there is a difference as a result of comparing image data received at the next focus position, that is, pixel information (the pixel value of each pixel of the entire image or a portion of the image) with pixel information on the image captured at the autofocus-initiated time, the image compensation module 222 may calculate brightness information based on the difference value. For example, referring to FIG. 3, when comparing portions (4×4 pixels) of two images, the pixel value of a second image is ½ smaller than the pixel value of a first image, which is a reference, which shows that the second image has brightness ½ lower than that of the first image. Accordingly, when the brightness information of the first image is 10 EV, the brightness information, that is, the exposure value, of the second image is increased by 1 EV and thus is changed to 11 EV. As it is confirmed that the brightness information of the image captured at the current focus position is different from the reference brightness information, the image compensation module 222 may compensate for the second image to have the same brightness as that of the first image in order to prevent an autofocus operation from being reset by an exposure change. For example, the image compensation module 222 may apply a gain value (for example, 2) to the pixel value of the second image before compensation so that the second image after compensation has the same pixel value as that of the first image. That is, the pixel value of the second image in FIG. 3 may be doubly compensated for to be the same pixel value of the second image after compensation.

According to various embodiments of the present disclosure, the autofocus processing module 223 may extract a high-frequency component from an image output from the image compensation module 222 to obtain autofocus detection data about the current focus position. Further, the autofocus processing module 223 may calculate an autofocus evaluation value for evaluating an autofocusing degree based on the obtained autofocus detection data. The autofocus processing module 223 may store the autofocus evaluation value calculated at each focus position in the buffer memory of the storage unit 240. When an autofocus search is completed, the autofocus processing module 223 may check the highest value (peak value) among the autofocus evaluation values corresponding to separate focus positions stored in the memory. The autofocus processing module 223 may perform control to adjust the focus on a subject to be photographed toward a focus position corresponding to the checked peak value. In addition, the autofocus processing module 223 may transmit a control signal for autofocus initiation to the imaging device 210 upon a request to implement a photographing application or a photographing function from a user. Accordingly, the imaging device 210 may be activated to operate by the received control signal and may drive the lens drive module 212. In addition, the lens module 211 of the imaging device 210 may start an operation for an autofocus search.

According to various embodiments, the autofocus processing module 223 may calculate the autofocus evaluation value of an image output from the image compensation module 222 without recognizing a change in exposure amount within an autofocus search range. When a change in exposure amount is identified within the autofocus search range, the autofocus processing module 223 may apply compensation information generated by the image compensation module 222 to the calculated autofocus evaluation value so that the autofocus operation may not be reset.

According to various embodiments of the present disclosure, the controller 220 may further include an image processing module (not shown). The image processing module may receive image data captured in focus at a correct focus, that is, the position corresponding to the peak value, detected by the autofocus processing module 223 and may perform image processing on the received image data. The image processing module may perform image processing, such as luminance signal processing (for example, edge processing or gamma processing) or color signal processing (for example, white balance or gamma correction) on the received image data based on a pixel unit. According to various embodiments, the image processing module may be included in the autofocus processing module 223 or may be configured as a separate module.

According to various embodiments of the present disclosure, the controller 220 may process information based on the operation of the electronic device or may process information based on the implementation of a program, an application, or a function, and may control the display 230 to display the processed information or may control an audio module (not shown) to output the processed information.

According to various embodiments of the present disclosure, the controller 220 may control the display 230 to display a captured image or various kinds of information (content) in the entire screen or a portion of the screen.

According to various embodiments, the controller 220 may transmit at least one piece of information or an image captured using autofocus, which can be displayed on the display unit 230, to a peripheral device (for example, a monitor, a TV, a wearable device, or a printer) connected via wireless Near-Field Communication (NFC) and may control the peripheral device (for example, a cover) to display the transmitted information.

According to various embodiments, the controller 220 may be a hardware component (function) or a software component (program) that includes at least one of various sensors provided in the electronic device, a data measurement module, an input/output interface, a module for managing the state or environment of the electronic device, and a communication module, which are a hardware module or a software module (for example, an application program).

Further, according to various embodiments of the present disclosure, the controller 220 of the electronic device may be at least a part of a processor and may include, for example, a combination of one or two or more of hardware, software, and firmware. According to various embodiments, the controller 220 may be configured by omitting at least some of the components or by further including other components for performing an image processing operation in addition to the components.

According to various embodiments of the present disclosure, from the aspect of hardware, at least a part of the controller 220 of the electronic device may be configured by including at least one processor including a Central Processing Unit (CPU)/Micro Processing Unit (MPU), a memory (for example, a register and/or Random Access Memory (RAM)) into which at least one memory loading data is loaded, and a portion of a bus that inputs/outputs at least one data to/from the processor and the memory. From the aspect of software, the controller 220 may be configured by including a predetermined program routine or program data that is loaded into the memory from a predetermined recording medium and is processed by the processor in order to perform a function defined in the electronic device.

According to various embodiments of the present disclosure, the display 230 (for example, a part of the input/output interface 150 or the display 160 of FIG. 1) of the electronic device may output operation execution result information (for example, at least one of text, an image, and a video) under the control of the controller 220.

According to various embodiments of the present disclosure, the display 230 may display, using various methods, an input pad (for example, a button) for inputting at least one of various characters, numbers, or symbols into an input window on the screen. Also, the display 230 may display a service execution screen based on the execution of various applications related to information transmission/reception. According to various embodiments, the display 230 may execute and display an application (for example, a camera application) for image capturing. When the application for image capturing is executed, the display 230 may display a captured image of a subject as a preview image. When an autofocus search is completed to focus on the subject, the display 230 may display, as a final captured image, an image captured according to an image capture request from the user.

According to various embodiments of the present disclosure, when the display 230 of the electronic device is provided in the form of a touch screen, the display 230 may correspond to a touch screen of the input unit 250. When the display 230 is provided together with the input unit 250 in the form of a touch screen, the display 230 may display various pieces of information generated depending on a touch motion by the user.

According to various embodiments, the display 230 of the electronic device may include at least one of a Liquid Crystal Display (LCD), a Thin-Film Transistor LCD (TFT-LCD), an Organic Light-Emitting Diode (OLED) display, a Light-Emitting Diode (LED) display, an Active-Matrix Organic LED (AMOLED) display, a flexible display, and a three-dimensional (3D) display. Some of these displays may be a transparent or light-transmissive type so that the displays can be seen through. This type may be a transparent display including a Transparent OLED (TOLED).

According to various embodiments of the present disclosure, the electronic device may further include another display (for example, an extended display or a flexible display) mounted in addition to the display 230 and a display of an external electronic device (for example, at least one of an external display device, a wearable device, and an external terminal device) interworking with the electronic device.

According to various embodiments of the present disclosure, the storage unit 240 of the electronic device (for example, the memory 130 of FIG. 1) may temporarily store various data generated during the execution of programs including a program necessary for a functional operation according to various embodiments. The storage unit 240 may largely include a program area and a data area. The program area may store pieces of relevant information for operating an electronic device, such as an Operating System (OS) that boots an electronic device. The data area may store transmitted and received data and generated data according to various embodiments. The storage unit 240 may include at least one storage medium among a flash memory, a hard disk, a multimedia card micro-type memory (for example, SD or XD memory), an RAM, and an ROM.

According to various embodiments of the present disclosure, the storage unit 240 may temporarily store image data received by photographing a subject according to an operation of the imaging device 210 under the control of the controller 220, and may temporarily store image data with brightness compensated for when the brightness of captured image data is changed depending on the change in exposure amount at each focus position. Further, the storage unit 240 may store, as a final captured image of the subject, image data obtained by capturing image data at the position of a correct focus detected through an automatic exposure search under the control of the controller 220. Upon storing the final captured image according to a capture signal, the storage unit 240 may delete image data temporarily stored in the buffer memory, that is, preview images.

According to various embodiments, the storage unit 240 may store autofocus evaluation values calculated through an autofocus search operation, and may store information related to an autofocus search (for example, at least one of set focus position information (e.g., focal distance), a shutter speed, an aperture value, a set Exposure Value (EV), information related to a lens, and information related to a sensor).

According to various embodiments of the present disclosure, the input unit 250 (for example, the input/output interface 150 of FIG. 1) of the electronic device may transmit, to the controller 220, various pieces of information including number and letter information input from the user and signals input in relation to setting up various functions and controlling the functions of the electronic device. Further, the input unit 250 may support user input for executing a module supporting a particular function or an application. The input unit 250 may include at least one of a key input tool such as a keyboard and a keypad, a touch input tool such as a touch sensor or a touch pad, a sound source input tool, a camera, and various sensors, and may also include a gesture input tool. In addition, the input unit 250 may include any type of input tool currently being developed or to be developed in the future. According to various embodiments of the present disclosure, the input unit 250 may receive user-input information from the user through a touch panel of the display unit 230 or a camera and may transmit the input information to the controller 220.

According to various embodiments of the present disclosure, the input unit 250 may transmit information related to a user's gesture received through the imaging device 210 (for example, a camera) or various sensors to the controller 220. Also, the input unit 250 may transmit an input signal based on the selection of at least one object (for example, content) displayed on the screen to the controller 220.

According to various embodiments of the present disclosure, the input unit 250 may receive an input signal for a mode switch (for example, a mode switch for image capturing) from the user through the sound source input tool and may transmit the input signal to the controller 220.

According to various embodiments, the input unit 250 may receive a selection of an application for a camera function displayed on the display 230, and may generate an input signal when the user selects a photographing button for photographing a subject and capturing a received image.

According to various embodiments of the present disclosure, the communication unit 260 (for example, the communication module 170 of FIG. 1) of the electronic device may communicate with another electronic device or an external device (for example, the electronic device 102 or 104 or the server 106 of FIG. 1) under the control of the controller 220. According to various embodiments, the communication unit 260 may transmit/receive data related to a performed operation to/from an external device under the control of the controller 220. The communication unit 260 may perform communication via a connection to a network or a device-to-device connection using wireless communication or wire-based communication through a communication interface. The wireless communication may include, for example, at least one of Wi-Fi, Bluetooth (BT), ZigBee, Z-Wave, Near-Field Communication (NFC), a Global Positioning System (GPS), and cellular communication (for example, LTE, LTE-A, CDMA, WCDMA, UMTS, WiBro, or GSM). The wire-based communication may include, for example, at least one of Universal Serial Bus (USB), High-Definition Multimedia Interface (HDMI), Recommended Standard 232 (RS-232), Plain Old Telephone Service (POTS), a Universal Asynchronous Receiver-Transmitter (UART), an Inter-Integrated Circuit (I2C), a Serial Peripheral Interface (SPI), and a Controller Area Network (CAN). In addition to the aforementioned communication modes, the communication unit 260 may include any type of communication mode that is generally known or is to be developed in the future.

According to various embodiments of the present disclosure, the electronic device may further include an audio module (not shown, for example, the input/output interface 150 of FIG. 1). The audio module may output a sound and may include, for example, at least one of an audio codec, a microphone (MIC), a receiver, an earphone output (EAR_L), and a speaker. According to various embodiments, the audio module may provide audio guidance information related to photographing when the photographing function is performed, and may output audio information included in a captured image.

According to various embodiments of the present disclosure, the electronic device may further include a tool for expressing a captured image or for providing a function based on the photographing operation using at least one of vibrations, a sense of touch, and smell.

In the above various embodiments of the present disclosure, the main components of the electronic device have been described with reference to FIG. 2. In various embodiments of the present disclosure, however, all components illustrated in FIG. 2 should not be interpreted as essential components, and the electronic device may be embodied using more components or fewer components than the illustrated components. In addition, the positions of the main components of the electronic device described above with reference to FIG. 2 may be changed depending on various embodiments.

An electronic device according to any one of various embodiments of the present disclosure may include: a signal processing module configured to receive a first image obtained by photographing a subject at a first position of at least one lens and to receive a second image obtained by photographing the subject at a second position of the lens, when an autofocus search is implemented; an image compensation module configured to generate compensation information using first brightness information on the first image and second brightness information on the second image and to compensate for a brightness of the second image using the compensation information; and an autofocus processing module configured to perform image processing and autofocus processing on the first image and the second image with the compensated brightness.

According to various embodiments of the present disclosure, the electronic device may further include: a lens drive module configured to move the lens from the first position to the second position; and a plurality of image sensors configured to capture the first image and the second image by sensing light incident through the lens from the subject.

According to various embodiments of the present disclosure, the image compensation module may calculate a gain offset value using a difference in brightness between the first image and the second image, and may generate the compensation information using the calculated gain offset value.

According to various embodiments of the present disclosure, the image compensation module may compensate for the second image when a difference in brightness between the first image and the second image is a set threshold value or greater.

According to various embodiments of the present disclosure, the image compensation module may obtain the first brightness information using a contrast between pixels of the first image and may obtain the second brightness information using a contrast between pixels of the second image.

According to various embodiments of the present disclosure, the autofocus processing module may obtain an autofocus evaluation value for the first position based on data resulting from image processing of the first image and may obtain an autofocus evaluation value for the second position based on data resulting from image processing of the second image with the compensated brightness.

According to various embodiments of the present disclosure, when the autofocus search is completed, the autofocus processing module may determine a position of the lens corresponding to a greatest value among autofocus evaluation values obtained at respective set positions of the lens including the first position and the second position to be a focus on the subject.

An operation procedure for autofocus in the aforementioned electronic device is described in detail with reference to the accompanying drawings.

Figure 4:
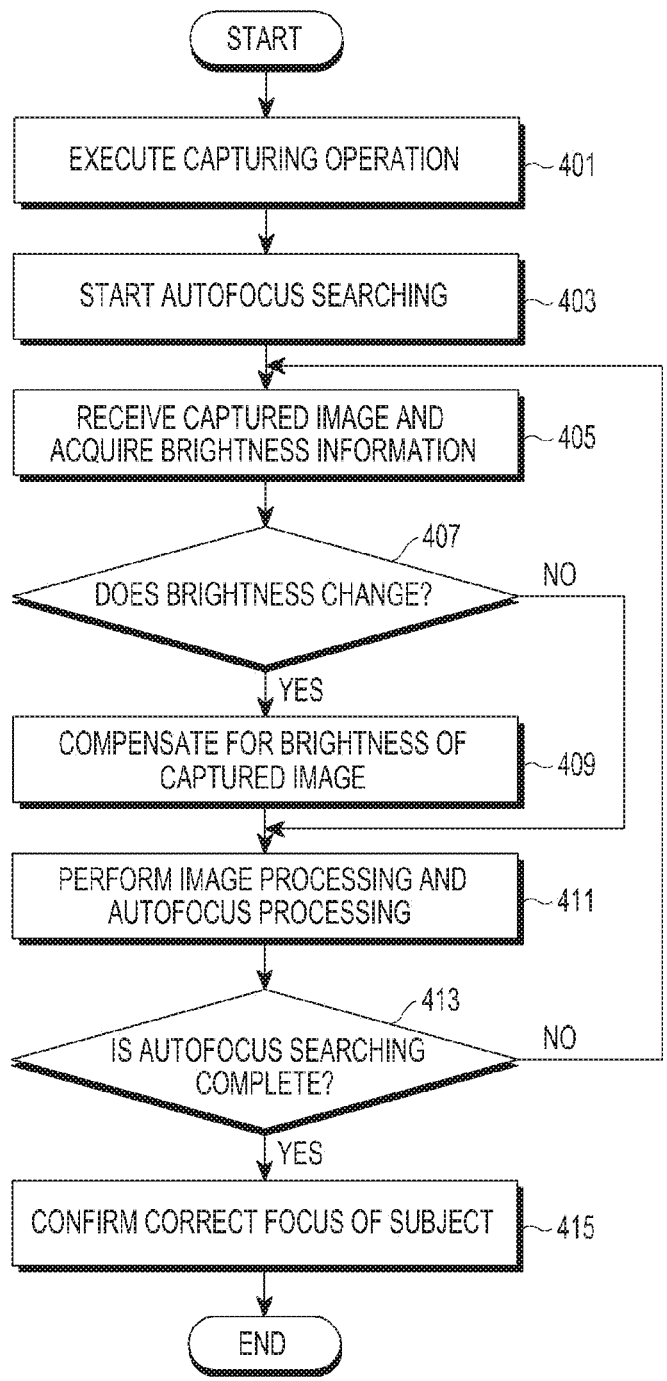
FIG. 4 illustrates an example of an operation procedure of an electronic device according to various embodiments of the present disclosure.
Figure 5:
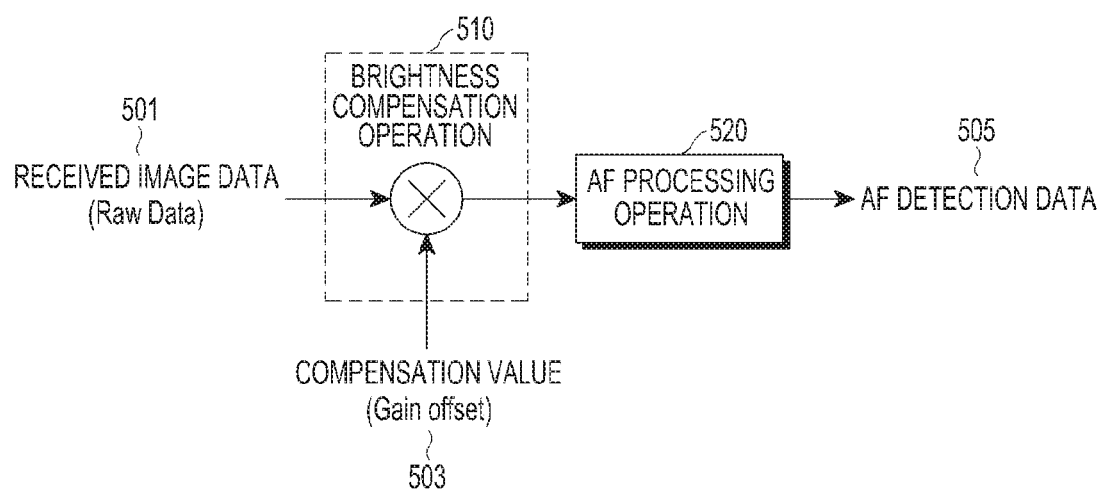
FIG. 5 illustrates an example of an operation procedure of an electronic device according to various embodiments of the present disclosure.

FIGS. 4 and 5 illustrate an example of an operation procedure of an electronic device according to various embodiments of the present disclosure.

Referring to FIG. 4, according to various embodiments of the present disclosure, in operation 401, the electronic device (for example, the electronic device 101 of FIG. 1 or the electronic device) may execute a photographing function or application upon request from a user.

In operation 403, when an imaging device is driven to apply power to a lens drive module as the photographing function or application is executed, the electronic device may start an autofocus search operation, moving a lens (for example, a focus lens) in a particular direction in order to focus on a subject. When the photographing function is executed and the autofocus search is started, the electronic device may convert light incident upon a plurality of image sensors through the lens into a digital signal according to initially set photographing conditions (a shutter speed, an aperture value, a set EV, or a focus start position) and may temporarily store the digital signal.

In operation 405, the electronic device may receive image data on an image captured at a current focus position and may obtain brightness information on the image by analyzing the received image data. According to various embodiments, the electronic device may identify pixel information (pixel value) through the contrast of a portion or the entire area of the captured image from the received image data and may identify the brightness of the captured image based on the identified pixel value.

In operation 407, the electronic device may check whether the brightness of the image is changed by identifying brightness information on the received image data. According to various embodiments, when the electronic device receives the image data at the focus start position, the electronic device may perform operation 411 without compensating for the brightness of the image. According to various embodiments, when the electronic device receives the image data at a focus position changed from the focus start position, the electronic device may compare the image data (for example, second image data) received at the current focus position (second focus position) with the image data (for example, first image data) received at the focus start position (first focus position), thereby checking a brightness change.

As a result of operation 407, when the brightness of the image is changed, the electronic device may perform operation 409. When the brightness of the image is not changed, the electronic device may perform operation 411.

In operation 409, the electronic device may compensate for the brightness of the image captured at the current focus position. According to various embodiments, the electronic device may obtain the brightness information on the image captured at the current focus position (for example, the second focus position). The electronic device may calculate compensation information including a gain value for compensating for brightness corresponding to the difference between the obtained brightness information and brightness information identified at the first focus position. The electronic device may compensate the captured image using the calculated compensation information so that the captured image has the same brightness as that of the image captured at the first focus position. According to various embodiments, referring to FIG. 5, when the electronic device receives a digital signal, that is, image data (raw image data) 501, through the plurality of image sensors of a sensor module, the electronic device may perform a brightness compensation operation 510 by multiplying the received image data 501 by compensation information (gain offset) 503.

In operation 411, the electronic device may perform image processing on the image data obtained at the current focus position according to an autofocus operation and may calculate an autofocus evaluation value for the current focus position based on the image-processed data. The electronic device may calculate a luminance value on the obtained image data, may calculate autofocus detection data using the calculated luminance value, and may use the calculated autofocus detection data as the autofocus evaluation value.

According to various embodiments, the electronic device may also calculate the autofocus evaluation value based on the autofocus detection data. Referring to FIG. 5, when received image data (raw data) on a captured image is received, an image compensation module of the electronic device may perform an operation 510 of compensating for the brightness of the image by multiplying the received image data by a compensation value (gain offset) 503. Accordingly, an autofocus processing module of the electronic device may perform an autofocus processing operation 520 on the image with the compensated brightness and may output autofocus detection data 505 that is an autofocus processing result. In the autofocus processing operation 520, the electronic device may perform image processing or may perform image processing on an image that has completely undergone autofocus processing through the image processing module. Thus, the electronic device may perform the operation 510 of compensating for the brightness of the captured image before the autofocus (AF) data processing operation 520, thereby continuously performing the autofocus search without resetting the autofocus search depending on the brightness change.

In operation 413, the electronic device may check whether the autofocus search is completed. As a result, when the autofocus search is completed, that is, when the movement of the lens within an autofocus search range is completed, the electronic device may perform operation 415. When the autofocus search is not completed, the electronic device may repeat operation 405 and the subsequent operations at the next focus position.

In operation 415, when the autofocus search is completed, the electronic device may determine a focus position having the highest value (peak value) of the autofocus evaluation values calculated at respective focus positions to be a correct focus and may calibrate the focus on the subject.

According to various embodiments, the electronic device may focus on a subject through the autofocus operation, may obtain image data captured at the position of the correct focus upon receiving a request to photograph the subject (input via a shutter or photograph button) from a user, and may store a captured image as a final captured image.

Figure 6:
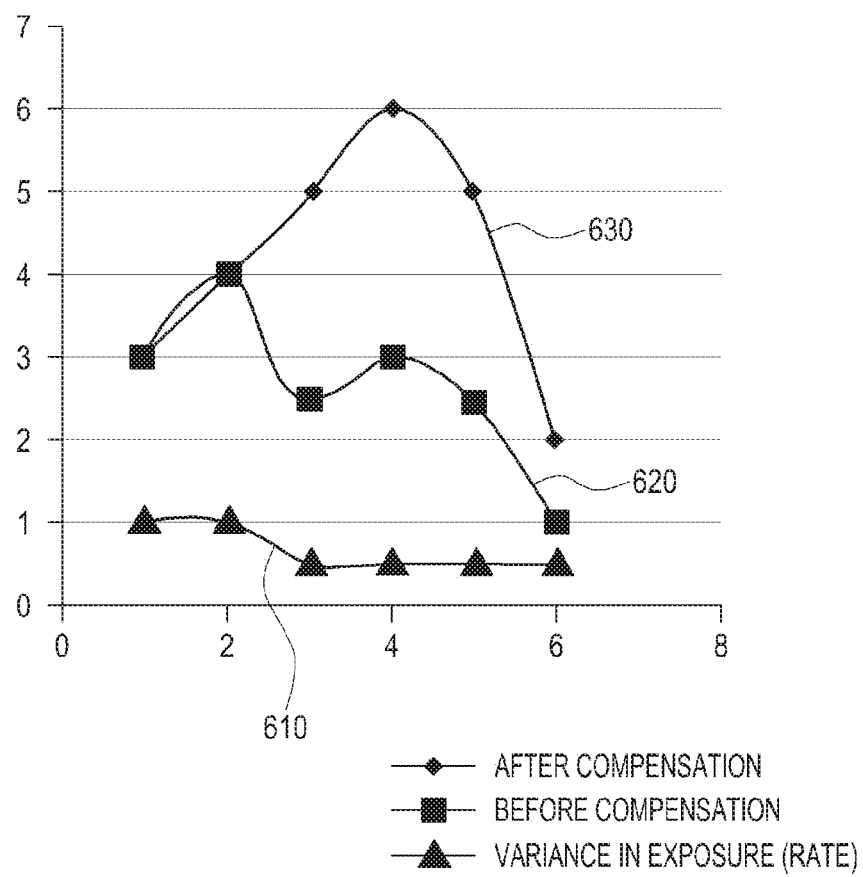
FIG. 6 illustrates an example of autofocus processing in an electronic device according to various embodiments of the present disclosure.

As described above, the autofocus operation enables the electronic device to continuously perform a focus search without resetting the autofocus search even though a brightness change occurs during the autofocus search. Referring to a graph 610 illustrated in FIG. 6, in an autofocus search, variance in exposure is reduced by half at a third focus position. When variance in exposure is reduced by half, the brightness of an image captured at the third focus position is reduced by half. Thus, referring to a graph 620, an autofocus evaluation value calculated at the third focus position is smaller than an autofocus evaluation value calculated at a second focus position. When the autofocus evaluation value calculated at the third focus position is lower than a reference value due to an exposure change, the electronic device may stop an autofocus search and may restart an autofocus search from the third focus position.

Referring to a graph 630, even though an exposure change occurs at the third focus position, since an autofocus evaluation value is calculated using image data with compensated brightness before processing autofocus data, the autofocus evaluation value at the third focus position may be calculated to be a greater value than that at the second focus position, without being affected by variance in brightness. Therefore, the autofocus search may not be reset but may be continuously performed.

Comparing the graph 620 with the graph 630, an autofocus evaluation value calculated at a fourth focus position in the graph 630 after brightness compensation is greater than an autofocus evaluation value calculated at the fourth focus position in the graph 620 before brightness compensation.

A method for autofocus processing in an electronic device according to any one of various embodiments of the present disclosure may include: receiving a first image obtained by photographing a subject at a first position of at least one lens when an autofocus search is implemented; performing image processing and autofocus processing on the first image; receiving a second image obtained by photographing the subject at a second position of the lens; generating compensation information using first brightness information on the first image and second brightness information on the second image; compensating for a brightness of the second image using the compensation information; and performing image processing and autofocus processing on the second image with the compensated brightness.

According to various embodiments of the present disclosure, the method may further include: capturing the first image by sensing light incident through the lens from the subject; capturing the second image by sensing light incident through the lens from the subject when the lens is moved to the second position.

According to various embodiments of the present disclosure, the method may further include: obtaining brightness information on the first image when the first image is received; and setting the obtained brightness information on the first image as reference brightness information for generating the compensation information.

According to various embodiments of the present disclosure, the generating of the compensation information using the first brightness information on the first image and the second brightness information on the second image may include: calculating a gain offset value using a difference in brightness information between the first image and the second image; and generating the compensation information using the calculated gain offset value.

According to various embodiments of the present disclosure, the compensating for the brightness of the second image using the compensation information may include compensating for the second image when a difference in brightness between the first image and the second image is a set threshold value or greater.

According to various embodiments of the present disclosure, the performing of image processing and autofocus processing on the first image may include obtaining an autofocus evaluation value for the first position based on data resulting from image processing of the first image.

According to various embodiments of the present disclosure, the performing of image processing and autofocus processing on the second image may include obtaining an autofocus evaluation value for the second position based on data resulting from image processing of the second image with the compensated brightness.

According to various embodiments of the present disclosure, the method may further include determining a focus on the subject when the autofocus search is completed, wherein the focus on the subject may be a position of the lens corresponding to a greatest value among autofocus evaluation values obtained at respective set positions of the lens including the first position and the second position.

Figure 7:
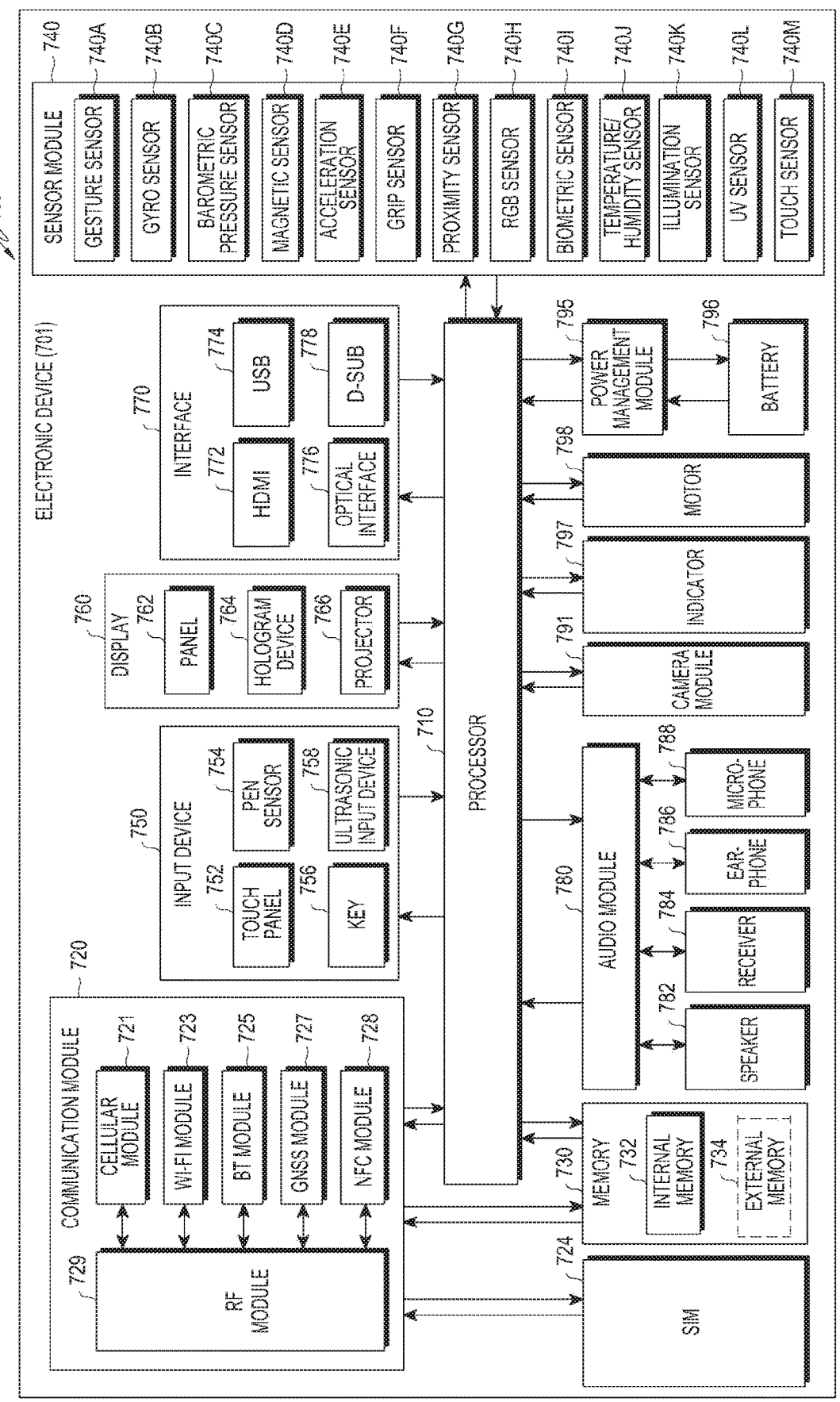
FIG. 7 is a block diagram of an electronic device according to various embodiments.

FIG. 7 is a block diagram of an electronic device 701 according to various embodiments.

The electronic device 701 may include, for example, all or part of the electronic device 101 illustrated in FIG. 1. The electronic device 701 may include one or more processors (for example, Application Processors (APs)) 710, a communication module 720, a Subscriber Identification Module (SIM) 724, a memory 730, a sensor module 740, an input device 750, a display 760, an interface 770, an audio module 780, a camera module 791, a power management module 795, a battery 796, an indicator 797, and a motor 798.

The processors 710 may run, for example, an operating system or an application to control a plurality of hardware or software components that are connected to the processors 710, and may perform various kinds of data processing and operations. The processors 710 may be configured, for example, as a System on Chip (SoC). According to one embodiment, the processors 710 may further include a Graphic Processing Unit (GPU) and/or an image signal processor. The processors 710 may include at least part (for example, a cellular module 721) of the components illustrated in FIG. 7. The processors 710 may load a command or data received from at least one of other components (for example, a nonvolatile memory) into a volatile memory to process the command or data, and may store various types of data in the nonvolatile memory.

The communication module 720 may have a configuration that is the same as, or similar to, that of the communication module 170 in FIG. 1. The communication module 720 may include, for example, a cellular module 721, a Wi-Fi module 723, a Bluetooth module 725, a global navigation satellite system (GNSS) module 727 (for example, a GPS module, a GLONASS module, a BeiDou module, or a Galileo module), an NFC module 728, and a Radio Frequency (RF) module 729.

The cellular module 721 may provide, for example, a voice call, a video call, a text messaging service, or an Internet service through a communication network. According to one embodiment, the cellular module 721 may perform identification and authentication of the electronic device 701 in a communication network using a Subscriber Identity Module (SIM, for example, a SIM card) 724. According to one embodiment, the cellular module 721 may perform at least some of the functions provided by the processors 710. According to one embodiment, the cellular module 721 may include a Communication Processor (CP).

The Wi-Fi module 723, the Bluetooth module 725, the GNSS module 727, and the NFC module 728 may each include a processor to process data transmitted and received via the respective modules. According to one embodiment, at least some (for example, two or more) of the cellular module 721, the Wi-Fi module 723, the Bluetooth module 725, the GNSS module 727, and the NFC module 728 may be included in one Integrated Chip (IC) or IC package.

The RF module 729 may transmit and receive, for example, a communication signal (for example, an RF signal). The RF module 729 may include, for example, a transceiver, a Power Amplifier (amp) Module (PAM), a frequency filter, a Low-Noise Amplifier (LNA), an antenna, or the like. According to another embodiment, at least one of the cellular module 721, the Wi-Fi module 723, the Bluetooth module 725, the GNSS module 727, and the NFC module 728 may transmit and receive an RF signal through a separate RF module.

The SIM 724 may include, for example, a card including a SIM and/or an embedded SIM, and may include unique identification information (for example, an Integrated Circuit Card Identifier (ICCID)) or subscriber information (for example, an International Mobile Subscriber Identity (IMSI)).

The memory 730 (for example, the memory 130) may include, for example, an internal memory 732 or an external memory 734. The internal memory 732 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable And Programmable ROM (EPROM), an Electrically Erasable and a Programmable ROM (EEPROM), a mask ROM, a flash ROM, a flash memory (for example, an NAND flash, an NOR flash, or the like), a hard drive, or a Solid-State Drive (SSD)).

The external memory 734 may further include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 734 may be functionally and/or physically connected to the electronic device 701 through various interfaces.

The sensor module 740 may measure, for example, physical quantities, or may detect the state of operation of the electronic device 701 and convert measured or detected information into an electrical signal. The sensor module 740 may include, for example, at least one of a gesture sensor 740A, a gyro sensor 740B, a barometric pressure sensor 740C, a magnetic sensor 740D, an accelerometer 740E, a grip sensor 740F, a proximity sensor 740G, a color sensor 740H (for example, a red, green, and blue (RGB) sensor), a biometric sensor 740I, a temperature/humidity sensor 740J, an illumination sensor 740K, and an ultraviolet (UV) sensor 740M. Additionally or alternatively, the sensor module 740 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 740 may further include a control circuit to control at least one or more sensors belonging thereto. In one embodiment, the electronic device 701 may further include a processor configured, as a part of the processors 710 or separately from the processors 710, to control the sensor module 740, thereby controlling the sensor module 740 while the processors 710 are in a sleep state.

The input device 750 may include, for example, a touch panel 752, a (digital) pen sensor 754, a key 756, or an ultrasonic input device 758. The touch panel 752 may be, for example, at least one of an electrostatic type, a pressure-sensitive type, an infrared type, and an ultrasonic type. Further, the touch panel 752 may further include a control circuit. The touch panel 752 may further include a tactile layer to provide a user with a tactile response.

The (digital) pen sensor 754 may, for example, be part of the touch panel or may include a separate recognition sheet. The key 756 may include, for example, a physical button, an optical key, or a keypad. The ultrasonic input device 758 may detect ultrasonic waves generated in an input tool through a microphone (for example, a microphone 788) and may identify data corresponding to the detected ultrasonic waves.

The display 760 (for example, a display 160) may include a panel 762, a hologram device 764, or a projector 766. The panel 762 may include a configuration that is the same as, or similar to, that of the display 160 of FIG. 1. The panel 762 may be configured, for example, to be flexible, transparent, or wearable. The panel 762 may be formed with the touch panel 752 in a single module. The hologram device 764 may display a three-dimensional image in the air using light interference. The projector 766 may project light onto a screen to display an image. The screen may be disposed, for example, inside or outside the electronic device 701. According to one embodiment, the display 760 may further include a control circuit to control the panel 762, the hologram device 764, or the projector 766.

The interface 770 may include, for example, a high-definition multimedia interface (HDMI) 772, a universal serial bus (USB) 774, an optical interface 776, or a D-sub-miniature (D-sub) 778. The interface 770 may be included, for example, in the communication module 170 illustrated in FIG. 1. Additionally or alternatively, the interface 770 may include, for example, a Mobile High-Definition Link (MHL) interface, a Secure Digital (SD) card/Multi-Media Card (MMC) interface, or an Infrared Data Association (IrDA) interface.

The audio module 780 may bidirectionally convert, for example, a sound and an electrical signal. At least some components of the audio module 780 may be included, for example, in the input/output interface 150 illustrated in FIG. 1. The audio module 780 may process sound information input or output, for example, through a speaker 782, a receiver 784, earphones 786, or the microphone 788.

The camera module 791 is a device that takes, for example, a still image and a video. According to one embodiment, the camera module 791 may include one or more image sensors (for example, a front sensor or a rear sensor), a lens, an Image Signal Processor (ISP), or a flash (for example, an LED, a xenon lamp, or the like).

The power management module 795 may manage, for example, the power of the electronic device 701. According to one embodiment, the power management module 795 may include a Power Management Integrated Circuit (PMIC), a charger Integrated Circuit (IC), or a battery or fuel gauge. The PMIC may have wire-based and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 796. The battery 796 may include, for example, a rechargeable battery and/or a solar battery.

The indicator 797 may display the specific state of the electronic device 701 or a component thereof (for example, the processors 710), which may be, for example, a booting state, a message state, or a charging state. The motor 798 may convert an electrical signal into mechanical vibrations, and may generate vibrations or a haptic effect. Although not shown, the electronic device 701 may include a processing device for supporting a mobile TV (for example, a GPU). The processing device for supporting the mobile TV may process media data in accordance with Digital Multimedia Broadcasting (DMB), Digital Video Broadcasting (DVB), or mediaFlo™ standards.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 8:
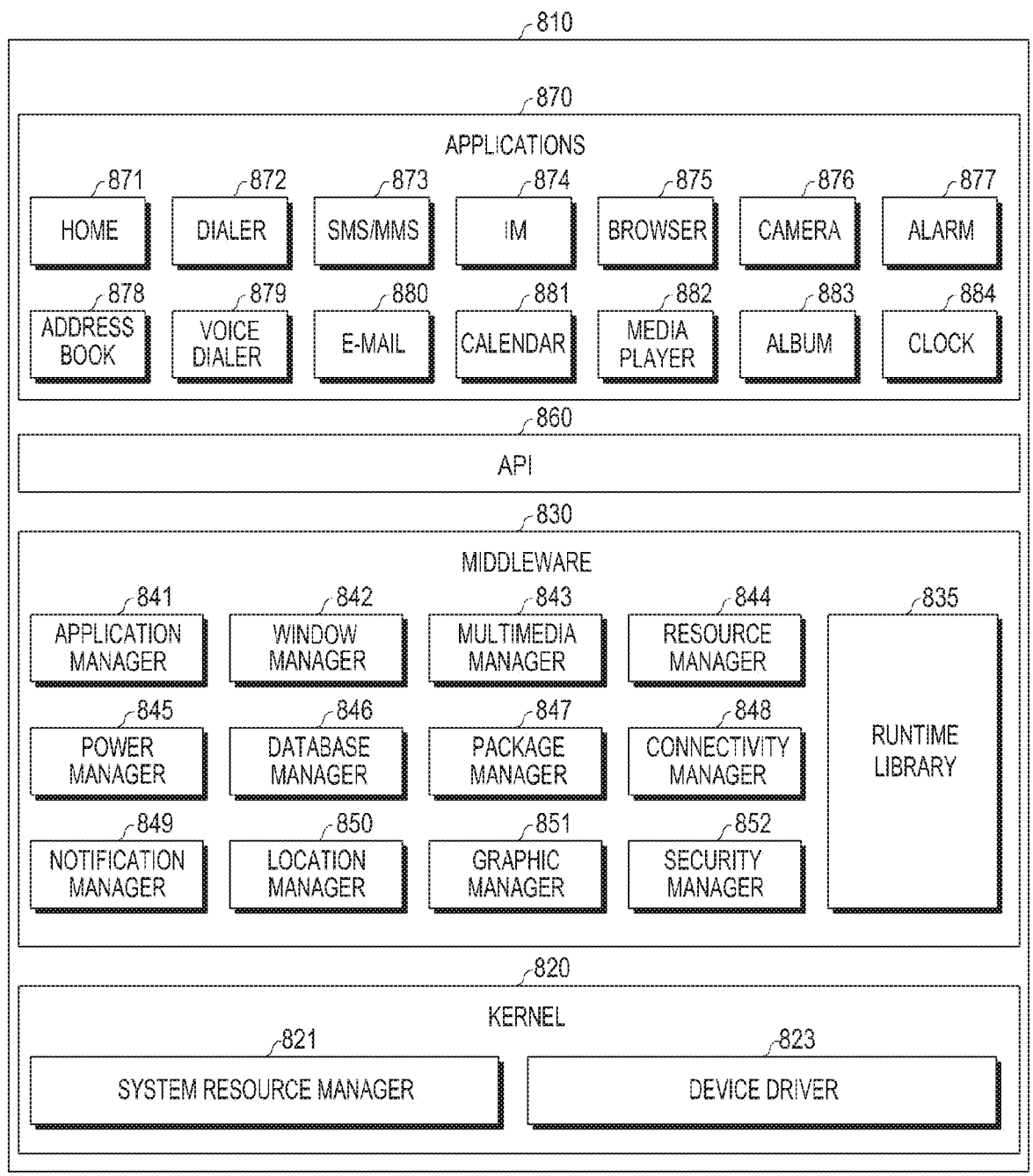
FIG. 8 is a block diagram of a program module according to various embodiments.

FIG. 8 is a block diagram of a program module according to various embodiments.

According to one embodiment, the program module 810 (for example, the program 140) may include an Operating System (OS) that controls resources related to an electronic device (for example, the electronic device 101) and/or various applications (for example, the application 147) that run on the OS. The OS may be, for example, Android, iOS, Windows, Symbian, Tizen, Bada, or the like.

The program module 810 may include a kernel 820, middleware 830, an API 860, and/or an application 870. At least part of the program module 810 may be preloaded onto the electronic device, or may be downloaded from an external electronic device (for example, the electronic device 102 or 104, the server 106, or the like).

The kernel 820 (for example, the kernel 141) may include, for example, a system resource manager 821 and/or a device driver 823. The system resource manager 821 may perform control, allocation, or recovery of system resources. According to one embodiment, the system resource manager 821 may include a process manager, a memory manager, or a file system manager. The device driver 823 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 830 may provide, for example, functions commonly needed for applications 870, or may provide the applications 870 with various functions through the API 860 so that the applications 870 may efficiently use the limited systems resources in the electronic device. According to one embodiment, the middleware 830 (for example, the middleware 143) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, and a security manager 852.

The runtime library 855 may include, for example, a library module used by a complier to add a new function through a programming language while the application 870 is running. The runtime library 855 may perform functions for input/output management, memory management, or mathematical calculations.

The application manager 841 may manage, for example, the life cycle of at least one application among the applications 870. The window manager 842 may manage graphic user interface (GUI) resources used for a screen. The multimedia manager 843 may identify formats that are necessary to play various media files, and may encode or decode a media file using a codec suitable for a corresponding format. The resource manager 844 may manage resources, such as a source code, a memory, or a storage space, for at least one application among the applications 870.

The power manager 845 may operate with, for example, a basic input/output system (BIOS) to manage a battery or power supply and may provide information on power necessary for operation of the electronic device. The database manager 846 may generate, retrieve, or change a database to be used for at least one application among the applications 870. The package manager 847 may install or update an application distributed in the form of a package file.

The connectivity manager 848 may manage wireless connectivity, for example, via Wi-Fi or Bluetooth. The notification manager 849 may display or report an incoming message, an appointment, and an event including a proximity notification in a manner that does not disturb a user. The location manager 850 may manage location information on the electronic device. The graphic manager 851 may manage a graphic effect to be provided for the user or a user interface related to the graphic effect. The security manager 852 may provide overall security functions necessary for system security or user authentication. According to one embodiment, when the electronic device (for example, the electronic device 101) has phone features, the middleware 830 may further include a telephony manager to manage a voice or video call function of the electronic device.

The middleware 830 may include a middleware module that forms combinations of various functions of the foregoing components. The middleware 830 may provide a specialized module for each type of OS in order to provide differentiated functions. Further, the middleware 830 may dynamically delete some of the existing components or add new components.

The API 860 (for example, the API 145) is, for example, a set of API programming functions, and may be provided with a different configuration depending on the OS. For example, one API set for each platform may be provided in the case of Android or iOS, while two or more API sets for each platform may be provided in the case of Tizen.

The application 870 (for example, the application 147) may include one or more applications that are capable of performing functions of, for example, a home screen 871, a dialer 872, SMS/MMS 873, instant messaging (IM) 874, a browser 875, a camera 876, an alarm 877, an address book 878, a voice dialer 879, email 880, a calendar 881, a media player 882, an album 883, a clock 884, or health care (for example, for measuring exercising or blood sugar), an environmental data application (for example, for providing atmospheric pressure, humidity, or temperature data), or the like.

According to one embodiment, the application 870 may include an application (hereinafter, "information exchange application" for convenience of description) that supports information exchange between the electronic device (for example, the electronic device 101) and an external electronic device (for example, the electronic device 102 or 104). The information exchange application may include, for example, a notification relay application for relaying specific information to the external electronic device or a device management application for managing the external electronic device.

For example, the notification relay application may include a function of relaying notification information, which is generated in another application (for example, the SMS/MMS application, the email application, the health care application, the environmental data application, or the like) of the electronic device, to the external electronic device (for example, the electronic device 102 or 104). Additionally, the notification relay application may receive notification information, for example, from the external electronic device and may provide the notification information to the user.

The device management application may manage (for example, install, delete, or update), for example, at least one function (for example, a function of turning on/turning off the external electronic device itself (or some components) or adjusting the brightness (or resolution) of a display) of the external electronic device (for example, the electronic device 102 or 104) communicating with the electronic device, an application operating in the external electronic device, or a service (for example, a call service or message service) provided by the external electronic device.

According to one embodiment, the application 870 may include an application (for example, a health care application of a mobile medical device) assigned according to the attributes of the external electronic device (for example, the electronic device 102 or 104). According to one embodiment, the application 870 may include an application received from the external electronic device (for example, the server 106 or the electronic device 102 or 104). According to one embodiment, the application 870 may include a third-party application that may be downloaded from a preloaded application or the server. The illustrated components of the program module 810, according to the embodiments, may be termed differently depending on the OS.

According to various embodiments, at least part of the program module 810 may be implemented in software, firmware, hardware, or combinations of at least two or more. At least part of the program module 810 may be implemented (for example, run) by, for example, a processor (for example, the processor 120). At least part of the program module 810 may include, for example, a module, a program, a routine, sets of instructions, or a process to perform one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiment, a computer-readable recording medium may record a program to be implemented on a computer, wherein the program may include an executable command for a processor to perform, when run by the processor: an operation of receiving a first image obtained by photographing a subject at a first position of at least one lens when an autofocus search is implemented; an operation of performing image processing and autofocus processing on the first image; an operation of receiving a second image obtained by photographing the subject at a second position of the lens; an operation of generating compensation information using first brightness information on the first image and second brightness information on the second image; an operation of compensating for a brightness of the second image using the compensation information; and an operation of performing image processing and autofocus processing on the second image with the compensated brightness.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. An electronic device comprising:
a camera including at least one lens; and
at least one processor electrically connected to the camera;
wherein the at least one processor configured to:
obtain a first image corresponding to a subject captured by the camera at a first position of the at least one lens and a second image corresponding to the subject captured by the camera at a second position of the lens, when an autofocus search is implemented,
obtain compensation information using first brightness information on the first image and second brightness information on the second image,
compensate a brightness of the second image using the compensation information to be equal to a brightness of the first image, and
perform image processing and autofocus processing on the first image and the second image based on the compensated brightness.

2. The electronic device of claim 1,
wherein the camera includes:
a lens drive processor configured to move the lens from the first position to the second position, and
a plurality of image sensors configured to capture the first image and the second image by sensing light incident through the at least one lens from the subject.

3. The electronic device of claim 1, wherein the at least one processor is configured to:
calculate a gain offset value using a difference in brightness between the first image and the second image, and
generate the compensation information using the calculated gain offset value.

4. The electronic device of claim 1, wherein the at least one processor is configured to compensate the brightness of the second image when a difference in brightness between the first image and the second image is a set threshold value or greater.

5. The electronic device of claim 1, wherein the at least one processor is configured to:
obtain the first brightness information using a contrast between pixels of the first image, and
obtain the second brightness information using a contrast between pixels of the second image.

6. The electronic device of claim 1, wherein the at least one processor is configured to:
obtain an autofocus evaluation value for the first position based on data resulting from image processing of the first image, and
obtain an autofocus evaluation value for the second position based on data resulting from image processing of the second image with the compensated brightness.

7. The electronic device of claim 6, wherein, when the autofocus search is completed, the at least one processor is configured to determine a position of the lens corresponding to a greatest value among autofocus evaluation values obtained at respective set positions of the lens comprising the first position and the second position to be a focus on the subject.

8. The electronic device of claim 1, wherein the at least one processor is configured to extract a high-frequency component from the first image or the second image and obtains autofocus detection data about a current focus position.

9. A method for autofocus processing in an electronic device, the method comprising:
obtaining a first image corresponding to a subject captured by a camera of the electronic device at a first position of at least one lens of the camera when an autofocus search is implemented;
performing image processing and autofocus processing on the first image;
obtaining a second image corresponding to the subject captured by the camera at a second position of the lens;
obtaining compensation information using first brightness information on the first image and second brightness information on the second image;
compensating a brightness of the second image using the compensation information to be equal to a brightness of the first image; and
performing image processing and autofocus processing on the second image based on the compensated brightness.

10. The method of claim 9, further comprising:
capturing the first image by sensing light incident through the lens from the subject; and
capturing the second image by sensing light incident through the lens from the subject when the lens is moved to the second position.

11. The method of claim 9, further comprising:
obtaining brightness information on the first image when the first image is received; and
setting the obtained brightness information on the first image as reference brightness information for generating the compensation information.

12. The method of claim 9, wherein the obtaining of the compensation information using the first brightness information on the first image and the second brightness information on the second image comprises:

calculating a gain offset value using a difference in brightness information between the first image and the second image; and generating the compensation information using the calculated gain offset value.

13. The method of claim 9, wherein the compensating the brightness of the second image using the compensation information comprises compensating the second image when a difference in brightness between the first image and the second image is a set threshold value or greater.

14. The method of claim 9, wherein the performing of the image processing and the autofocus processing on the first image comprises obtaining an autofocus evaluation value for the first position based on data resulting from image processing of the first image.

15. The method of claim 9, wherein the performing of the image processing and the autofocus processing on the second image comprises obtaining an autofocus evaluation value for the second position based on data resulting from image processing of the second image with the compensated brightness.

16. The method of claim 9, further comprising:

determining a focus on the subject when the autofocus search is completed, wherein the focus on the subject is a position of the lens corresponding to a greatest value among autofocus evaluation values obtained at respective set positions of the lens comprising the first position and the second position.

17. A non-transitory computer-readable recording medium configured to store a program comprising executable instructions which, when executed by a processor, cause the processor to perform operations comprising:

obtaining a first image corresponding to a subject captured by a camera of an electronic device at a first position of at least one lens of the camera when an autofocus search is implemented;

performing image processing and autofocus processing on the first image;

obtaining a second image corresponding to the subject captured by the camera at a second position of the lens;

obtaining compensation information using first brightness information on the first image and second brightness information on the second image;

compensating a brightness of the second image using the compensation information to be equal to a brightness of the first image; and an operation of performing image processing and autofocus processing on the second image based on the compensated brightness.

* * * * *